US012518311B2

United States Patent
D'Souza et al.

(10) Patent No.: US 12,518,311 B2
(45) Date of Patent: Jan. 6, 2026

(54) SIZING RANGE OF ITEMS BASED ON DISTRIBUTION CENTERS AND STORES IN A SUPPLY CHAIN NETWORK

(71) Applicant: Tata Consultancy Services Limited, Mumbai (IN)

(72) Inventors: Shaun Cyprian D'Souza, Mumbai (IN); Gaurav Jain, Lucknow (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 255 days.

(21) Appl. No.: 18/413,915

(22) Filed: Jan. 16, 2024

(65) Prior Publication Data
US 2025/0117840 A1    Apr. 10, 2025

(30) Foreign Application Priority Data
Oct. 4, 2023    (IN) .............................. 202321066595

(51) Int. Cl.
*G06Q 30/00*    (2023.01)
*G06Q 30/0202*  (2023.01)
*G06Q 30/0204*  (2023.01)
*G06Q 30/0601*  (2023.01)

(52) U.S. Cl.
CPC ..... *G06Q 30/0631* (2013.01); *G06Q 30/0202* (2013.01); *G06Q 30/0205* (2013.01)

(58) Field of Classification Search
CPC ................................................ G06Q 30/0631
See application file for complete search history.

(56) References Cited

U.S. PATENT DOCUMENTS

| 7,006,981 B2 * | 2/2006 | Rose ................ G06Q 10/06375 705/28 |
| 2020/0279217 A1 * | 9/2020 | Gravelle .............. B65G 1/1373 |
| 2022/0129928 A1 * | 4/2022 | Karthik ............. G06Q 30/0202 |

(Continued)

FOREIGN PATENT DOCUMENTS

WO    WO 2022/162714 A1    8/2022

OTHER PUBLICATIONS

Geevers, Kevin. Deep reinforcement learning in inventory management. MS thesis. University of Twente, 2020.*

(Continued)

*Primary Examiner* — Kathleen Palavecino
(74) *Attorney, Agent, or Firm* — FINNEGAN, HENDERSON, FARABOW, GARRETT & DUNNER LLP (57) ABSTRACT

Conventional techniques implemented various explicit rules and engineer systems to deliver a solution. Stores and Distribution Centers (DC's) are faced with problems related to excess inventory/lack of inventory which vary with several, and the biggest challenge lies in matching supply with demand. Present disclosure provides systems and methods that perform node ranging wherein range of items are stocked in stores and DCs for fulfilling demand. The system identifies stores and DCs and further recommend store specific items based on a request received by the system and then implements a supervised machine learning model and a reinforcement learning models determine a range of items to be sized from the recommended store specific items which are based on most frequent line items being identified from a set of inputs received therein.

15 Claims, 8 Drawing Sheets

(56) References Cited

U.S. PATENT DOCUMENTS

2023/0297954 A1\* 9/2023 Adulyasak ......... G06Q 30/0202
  705/7.31
2024/0005237 A1\* 1/2024 Muthusamy ........... G06N 3/006
2024/0346438 A1\* 10/2024 Parvatam Lakshmi .....................
  G06Q 30/0201

OTHER PUBLICATIONS

Nazneen N Sultana et al., "Reinforcement Learning for Multi-Product Multi-Node Inventory Management in Supply Chains," 2020, arxiv, https://www.researchgate.net/publication/342026638_Reinforcement_Learning_for_Multi-Product_Multi-Node_Inventory_Management_in_Supply_Chains.

Chuning Deng et al., "A Deep Learning-Based Inventory Management and Demand Prediction Optimization Method for Anomaly Detection," Wireless Communications and Mobile Computing, 2021, Hindawi, https://www.hindawi.com/journals/wcmc/2021/9969357/.

Edward Elson Kosasiha et al., "Reinforcement Learning Provides a Flexible Approach for Realistic Supply Chain Safety," Stock Optimisation, 2021, arxiv, https://arxiv.org/pdf/2107.00913.pdf.

Sergio Caballero et al. "Artificial Intelligence/Machine Learning + Supply Chain Planning," 2008, a MIT Center for Transportation & Logistics, https://ctl.mit.edu/sites/ctl.mit.edu/files/2020-07/AI_Machine_Learning_Supply_Chain_Planning_MIT_CTL_Nov_18_RT.pdf.

\* cited by examiner

SIZING RANGE OF ITEMS BASED ON DISTRIBUTION CENTERS AND STORES IN A SUPPLY CHAIN NETWORK

PRIORITY CLAIM

This U.S. patent application claims priority under 35 U.S.C. § 119 to: Indian Patent Application number 202321066595, filed on Oct. 4, 2023. The entire contents of the aforementioned application are incorporated herein by reference.

TECHNICAL FIELD

The disclosure herein generally relates to node ranging techniques in supply chain networks, and, more particularly, to sizing range of items based on distribution centers and stores in a supply chain network.

BACKGROUND

With the surge in online business, focusing only on regular assortments may not serve an intended purpose. Online channel has given rise to proliferation of Stock Keeping Units (SKUs) not only at a store level but also in various fulfilment centers. This becomes equally important to decide which products/items to keep at every node (e.g., at each store) depending on various attributes affecting sales, for example, demand, geography, demography, etc. For any new fulfilment center that is being opened by a customer, it helps them to decide what they should keep as a stock in their facilities looking at their online sales, product affinity, sales forecast, geography (region/zip codes), demography, etc.

Conventional state of the art models/techniques implement various explicit rules and engineering systems to deliver a solution. Stores and Distribution Centers (DC's) are faced with a larger number of problems related to excess inventory or lack of inventory. These vary in several factors such as seasonality, weather, location, and demographics. The supply chain is a complex ecosystem with interconnected stores, regional DCs and ecommerce channels. Recent disruptions in the domain also have made it critical for supply chains to have resilience to handle unexpected events. However, the biggest challenge lies in matching supply with demand.

SUMMARY

Embodiments of the present disclosure present technological improvements as solutions to one or more of the above-mentioned technical problems recognized by the inventors in conventional systems.

For example, in one aspect, there is provided a processor implemented method for sizing range of items based on distribution centers and stores in a supply chain network. The method comprises receiving, via one or more hardware processors, a first input comprising a date pertaining to one or more features specific to sales of items, one or more stock keeping units specific to one or more items, information specific to a plurality of associated stores, a plurality of distribution centers, an online sales information pertaining to the one or more items, an affinity associated with the one or more items, a sales forecast, an associated geography, and a demography, wherein a plurality of stores are in a vicinity of each of the plurality of distribution centers, and wherein each store from the plurality of associated stores comprises a node value; pre-processing, via the one or more hardware processors, the received first input to obtain a pre-processed data; obtaining, via the one or more hardware processors, a second input comprising a date, one or more stores, one or more ecommerce channels, and a set of items; identifying, via the one or more hardware processors, one or more distribution centers and one or more distribution center specific stores based on the pre-processed data; recommending, via the one or more hardware processors, a set of store specific items based on the one or more distribution center specific stores and the one or more distribution centers being identified; and determining, by using a supervised machine learning (ML) model and a reinforcement learning (RL) model, via the one or more hardware processors, a range of items to be sized from the recommended set of store specific items at each of the one or more distribution center specific stores based on the second input comprising the date, the one or more stores, and the set of items; wherein the range of items are determined based on most frequent line items being identified from the received first input.

In an embodiment, the first input is pre-processed for creation of one or more categorical sales bins and elimination of skewed data from the first input.

In an embodiment, the method further comprises forecasting items sale for a subsequent time duration using the one or more categorical sales bins.

In an embodiment, the supervised machine learning (ML) model is obtained by: obtaining sales information pertaining to the plurality of associated stores; performing at least one of: (i) training the supervised machine learning (ML) model based on a change observed in the sales information, and serializing a pickle of the supervised ML model being trained; or (ii) deserializing one or more load weights of the ML model based on the sales information; predicting one or more items by using the supervised ML model and the one or more load weights of the ML model; and evaluating an accuracy score of the supervised ML model for the one or more predicted items.

In an embodiment, the supervised machine learning (ML) model and the reinforcement learning (RL) model are trained and evaluated using a learning framework based on the sales information to obtain a pickle bin serialization model.

In an embodiment, a time step observation is provided to the RL model for training along with the sales information.

In an embodiment, the RL model is configured to provide an action corresponding to the time step observation to range items from the one or more categorical sales bins.

In another aspect, there is provided a processor implemented system for sizing range of items based on distribution centers and stores in a supply chain network. The system comprises: a memory storing instructions; one or more communication interfaces; and one or more hardware processors coupled to the memory via the one or more communication interfaces, wherein the one or more hardware processors are configured by the instructions to: receive a first input comprising a date pertaining to one or more features, one or more stock keeping units specific to one or more items, information specific to a plurality of associated stores, a plurality of distribution centers, an online sales information pertaining to the one or more items, an affinity associated with the one or more items, a sales forecast, an associated geography, and a demography, wherein a plurality of stores are in a vicinity of each of the plurality of distribution centers, and wherein each store from the plurality of associated stores comprises a node value; pre-process the received first input to obtain a pre-processed data; obtain a second input comprising a date, one or more stores, one or more ecommerce channels, and a set of items; identify one or more distribution centers and one or more distribution center specific stores based on the pre-processed data; recommend a set of store specific items based on the one or more distribution center specific stores and the one or more distribution centers being identified; and determine, by using a supervised machine learning (ML) model and a reinforcement learning (RL) model, a range of items to be sized from the recommended set of store specific items at each of the one or more distribution center specific stores based on the second input comprising the date, the one or more stores, and the set of items; wherein the range of items are determined based on most frequent line items being identified from the received first input.

In an embodiment, the first input is pre-processed for creation of one or more categorical sales bins and elimination of skewed data from the first input.

In an embodiment, the one or more hardware processors are further configured by the instructions to forecast items sale for a subsequent time duration using the one or more categorical sales bins.

In an embodiment, the supervised machine learning (ML) model is obtained by obtaining sales information pertaining to the plurality of associated stores; performing at least one of: (i) training the supervised machine learning (ML) model based on a change observed in the sales information, and serializing a pickle of the supervised ML model being trained; or (ii) deserializing one or more load weights of the ML model based on the sales information; predicting one or more items by using the supervised ML model and the one or more load weights of the ML model; and evaluating an accuracy score of the supervised ML model for the one or more predicted items.

In an embodiment, the supervised machine learning (ML) model and the reinforcement learning (RL) model are trained and evaluated using a learning framework based on the sales information to obtain a pickle bin serialization model.

In an embodiment, a time step observation is provided to the RL model for training along with the sales information.

In an embodiment, the RL model is configured to provide an action corresponding to the time step observation to range items from the one or more categorical sales bins.

In yet another aspect, there are provided one or more non-transitory machine-readable information storage mediums comprising one or more instructions which when executed by one or more hardware processors cause a method for sizing range of items based on distribution centers and stores in a supply chain network by receiving a first input comprising a date pertaining to one or more features specific to sales of items, one or more stock keeping units specific to one or more items, information specific to a plurality of associated stores, a plurality of distribution centers, an online sales information pertaining to the one or more items, an affinity associated with the one or more items, a sales forecast, an associated geography, and a demography, wherein a plurality of stores are in a vicinity of each of the plurality of distribution centers, and wherein each store from the plurality of associated stores comprises a node value; pre-processing the received first input to obtain a pre-processed data; obtaining a second input comprising a date, one or more stores, one or more ecommerce channels, and a set of items; identifying one or more distribution centers and one or more distribution center specific stores based on the pre-processed data; recommending a set of store specific items based on the one or more distribution center specific stores and the one or more distribution centers being identified; and determining, by using a supervised machine learning (ML) model and a reinforcement learning (RL) model, a range of items to be sized from the recommended set of store specific items at each of the one or more distribution center specific stores based on the second input comprising the date, the one or more stores, and the set of items; wherein the range of items are determined based on most frequent line items being identified from the received first input.

In an embodiment, the first input is pre-processed for creation of one or more categorical sales bins and elimination of skewed data from the first input.

In an embodiment, the method further comprises forecasting items sale for a subsequent time duration using the one or more categorical sales bins.

In an embodiment, the supervised machine learning (ML) model is obtained by: obtaining sales information pertaining to the plurality of associated stores; performing at least one of: (i) training the supervised machine learning (ML) model based on a change observed in the sales information, and serializing a pickle of the supervised ML model being trained; or (ii) deserializing one or more load weights of the ML model based on the sales information; predicting one or more items by using the supervised ML model and the one or more load weights of the ML model; and evaluating an accuracy score of the supervised ML model for the one or more predicted items.

In an embodiment, the supervised machine learning (ML) model and the reinforcement learning (RL) model are trained and evaluated using a learning framework based on the sales information to obtain a pickle bin serialization model.

In an embodiment, a time step observation is provided to the RL model for training along with the sales information.

In an embodiment, the RL model is configured to provide an action corresponding to the time step observation to range items from the one or more categorical sales bins.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

In legacy systems, explicit engineered rules have limitations including extended product/item lifecycles, lack of extensibility and reusability. Rules have to be explicitly maintained resulting in additional overheads around infrastructure, personnel, Research & Development (R&D), and their inter-relation (e.g., Human-machine, Machine first delivery model (MFDM), Business 4.0, etc.). Artificial Intelligence (AI) circumvents and/or lowers principle barriers to entry in an industry. Consideration tradeoffs include access to open-source code, pricing, licensing models, packaging, cloud deployment, security/reliability/uptime, proprietary ecosystems, legacy software, and phased lifecycles.

Further, Artificial Intelligence (AI) alleviates specific kinks in an end-to-end supply chain resulting in cost and operational benefits. The supply chain costs can be expressed as a sum of 5 factors (material, labor, logistics, inventory holding, and overhead costs). The pandemic has disrupted consumer behavior and retailers have had to adapt to newer dynamics and customer trends. Present state of the art models used in the area of Node range use explicit rules engineering to deliver a solution. Stores and DCs are faced with a larger number of problems related to excess inventory or lack of inventory. These vary in a number of factors such as seasonality, weather, location, and demographics. Sizing the item-level inventory at any given node in a supply chain network can bring about billions of dollars in savings in operational costs. The supply chain is a complex ecosystem with interconnected stores, regional DCs and e-commerce channels. Also, recent disruptions have made it critical for supply chains to have the resiliency to handle unexpected events. The biggest challenge lies in matching supply with demand. Embodiments of the present disclosure provide system and method that implement AI/machine learning (ML) model-based node range (e.g., range of items being sized).

Referring now to the drawings, and more particularly to FIGS. 1 through 8, where similar reference characters denote corresponding features consistently throughout the figures, there are shown preferred embodiments and these embodiments are described in the context of the following exemplary system and/or method.

Figure 1:
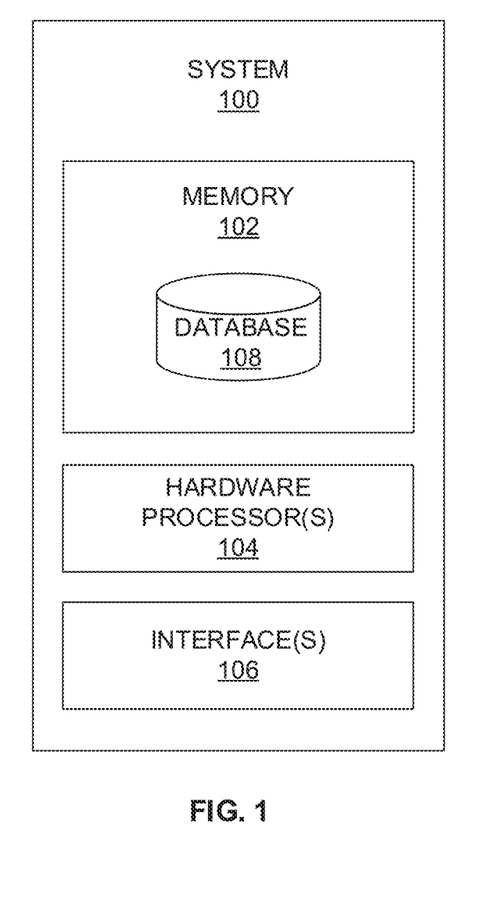
FIG. 1 depicts an exemplary system for sizing range of items based on distribution centers and stores in a supply chain network, in accordance with an embodiment of the present disclosure.

FIG. 1 depicts an exemplary system 100 for sizing range of items based on distribution centers and stores in a supply chain network, in accordance with an embodiment of the present disclosure. In an embodiment, the system 100 includes one or more hardware processors 104, communication interface device(s) or input/output (I/O) interface(s) 106 (also referred as interface(s)), and one or more data storage devices or memory 102 operatively coupled to the one or more hardware processors 104. The one or more processors 104 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is/are configured to fetch and execute computer-readable instructions stored in the memory. In an embodiment, the system 100 can be implemented in a variety of computing systems, such as laptop computers, notebooks, hand-held devices (e.g., smartphones, tablet phones, mobile communication devices, and the like), workstations, mainframe computers, servers, a network cloud, and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random-access memory (SRAM) and dynamic-random access memory (DRAM), and/or non-volatile memory, such as read only memory (ROM), erasable programmable ROM, flash memories, hard disks, optical disks, and magnetic tapes. In an embodiment, a database 108 is comprised in the memory 102, wherein the database 108 comprises information such as date(s) pertaining to one or more features specific to sales of items, one or more stock keeping units specific to one or more items, details associated with a plurality of associated stores, details associated with a plurality of distribution centers, an online sales information pertaining to the one or more items, an affinity associated with the one or more items, a sales forecast, an associated geography, and a demography. The database 108 further comprises historical sales information (e.g., also referred as 'sales information' or 'sales data' and may be interchangeably used herein) pertaining to the plurality of associated stores, and the like. The memory 102 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Figure 2:
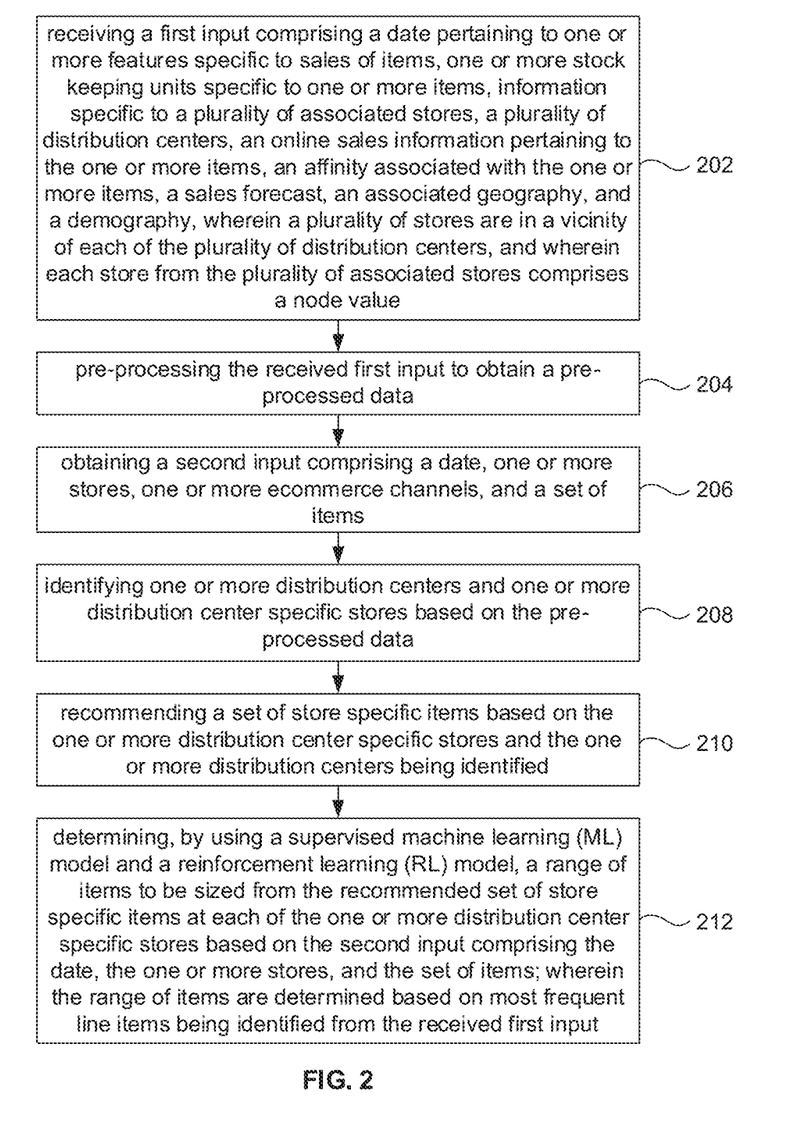
FIG. 2 depicts an exemplary flow chart illustrating a method for sizing range of items based on distribution centers and stores in a supply chain network, using the system 100 of FIG. 1, in accordance with an embodiment of the present disclosure.

FIG. 2, with reference to FIG. 1, depicts an exemplary flow chart illustrating a method for sizing range of items based on distribution centers and stores in a supply chain network, using the system 100 of FIG. 1, in accordance with an embodiment of the present disclosure. The expression "Ranging" or "sizing" refers to the number of products/items for any given item SKU a retailer must stock in a store or distribution center (DC). The system 100 described herein present a formal definition of the node range problem and implement the method of FIG. 2 to size inventory in a supply chain network node.

In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, and the flow diagram as depicted in FIG. 2.

At step 202 of the method of the present disclosure, the one or more hardware processors 104 receive a first input comprising a date pertaining to one or more features (e.g., item, store, dc, and e-commerce channel(s)) specific to sales of items, one or more stock keeping units specific to one or more items, information specific to a plurality of associated stores, a plurality of distribution centers, an online sales information pertaining to the one or more items, an affinity associated with the one or more items, a sales forecast, an associated geography, and a demography, wherein a plurality of stores are in a vicinity of each of the plurality of distribution centers. In an embodiment, a plurality of stores is in a vicinity of each of the plurality of distribution centers. Further, each store from the plurality of associated stores comprises a node value. Below Table 1 and Table 2 provide an illustrative example of the first input.

TABLE 1

| Division | Number of stores (Node) | Number of articles (GAN) |
|---|---|---|
| Central | 90 | 2735 |
| North | 84 | 2694 |
| South | 77 | 2748 |

TABLE 2

| Generic article number (GAN) | GAN int64 |
| Store ID | Node int64 |
| Year | Year int64 |
| Week number | WeekNo int64 |
| Sales quantity | |

The system 100 explored various datasets and picked a dataset which has sales data for knitwear category. The dataset provided sales information for 2018, 2020 across 300 stores and 3000 item SKUs as shown in Tables 1 and Table 2.

Figure 3:
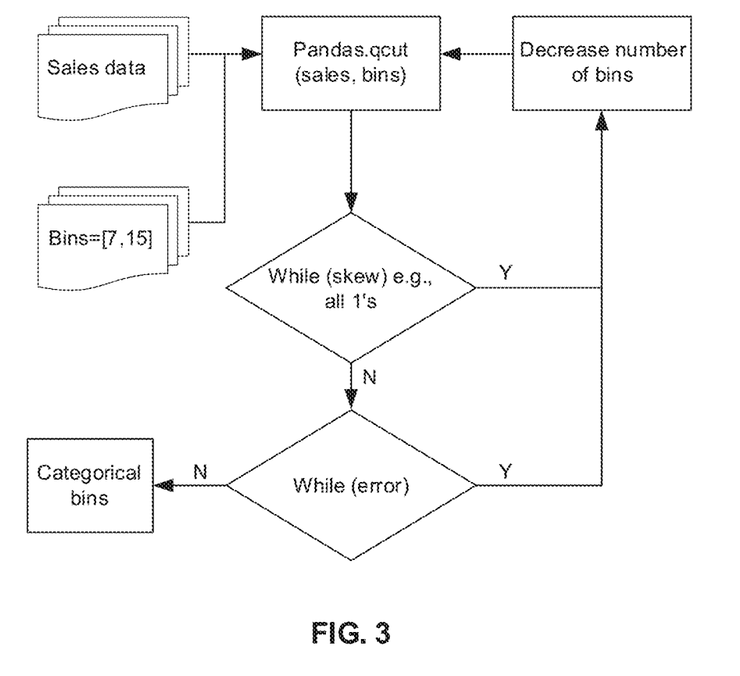
FIG. 3 depicts a flow chart illustrating a method for creation of categorical sales bin to eliminate data skew (e.g., all 1's), in accordance with an embodiment of the present disclosure.

At step 204 of the method of the present disclosure, the one or more hardware processors 104 pre-process the received first input to obtain a pre-processed data. More specifically, the first input is pre-processed for creation of one or more categorical sales bins and elimination of skewed data from the first input. The first input is pre-processed using a transformation technique including the creation of categorical bins for noisy or skewed sales data. FIG. 3, with reference to FIGS. 1 through 2, depicts a flow chart illustrating a method for creation of categorical sales bin to eliminate data skew (e.g., all 1's), in accordance with an embodiment of the present disclosure. A sample set of bins are shown in Table 3: Categorical sales bins-number of units.

The first input is pre-processed for creation of one or more categorical sales bins and elimination of skewed data from the first input, in one example embodiment. This is done through identification of top selling items in a retailer's store. Sales data (e.g., the first input) is run through a series of steps to clean and pre-process the sales data. Some of these include removing of outliers and creation of categorical bins. These take a noisy dataset and make it consumable in a machine learning (ML) model which would otherwise find it difficult to train owing to large skew or noise in the dataset. In classical approaches explicit rules may be used to look up specific line items in a dataset. However, these necessitate the maintenance of large data tables which consume large amounts of memory and other system resources. Below Table 3 depicts categorical bins being created with number of units, by way of illustrative examples:

TABLE 3

| 0 | (0.0, 3.0] | 5 | (45.0, 68.0] | 10 | (331.0, 495.0] |
| 1 | (3.0, 7.0] | 6 | (68.0, 101.0] | 11 | (495.0, 773.0] |
| 2 | (7.0, 15.0] | 7 | (101.0, 147.0] | 12 | (773.0, 1298.0] |
| 3 | (15.0, 27.0] | 8 | (147.0, 216.0] | 13 | (1298.0, 2694.0] |
| 4 | (27.0, 45.0] | 9 | (216.0, 331.0] | 14 | (2694.0, 21351.0] |

At step 206 of the method of the present disclosure, the one or more hardware processors 104 obtain a second input comprising a date, one or more stores, one or more ecommerce channels, and a set of items. By way of example, in some embodiments, exemplary second input (also referred as input training data) may include, a date, one or more distribution centers, one or more stores, one or more items, a sales forecast and one or more e-commerce channels wherein the second input is depicted in below Table 4:

TABLE 4

| Date | DC | Store | Item | Sales Quantity | E-commerce channel |
|---|---|---|---|---|---|
| Aug. 1, 2018 | 0 | 97 | 29 | 1 | 1 |
| Aug. 1, 2018 | 0 | 97 | 83 | 5 | 1 |
| Aug. 1, 2018 | 0 | 97 | 86 | 11 | 0 |
| Aug. 1, 2018 | 1 | 55 | 83 | 7 | 1 |
| Aug. 1, 2018 | 1 | 55 | 86 | 4 | 1 |
| Aug. 1, 2018 | 1 | 55 | 176 | 10 | 1 |
| Aug. 1, 2018 | 2 | 84 | 83 | 3 | 1 |
| Aug. 1, 2018 | 2 | 84 | 86 | 1 | 0 |
| Aug. 1, 2018 | 2 | 84 | 176 | 12 | 1 |

At step 208 of the method of the present disclosure, the one or more hardware processors 104 identify one or more distribution centers and one or more distribution center specific stores based on the pre-processed data.

These were consolidated to 30 number of stores across 3 Division/DCs. Number of articles were consolidated to 250 for the forecasting model(s) of the present disclosure. Some of the item level details available to the forecasting models are below (also refer Table 2). Owing to the large skew in the data with a majority of sales at the single unit level, the data was consolidated across two configurations. Below Table 5 depicts the configuration with number of products/items, number of stores, and number of DCs, by way of illustrative examples:

TABLE 5

| Number of products/items | Number of stores | Number of DCs |
|---|---|---|
| 250 | 30 | 3 |
| 10 | 6 | 3 |

Once the one or more distribution centers are identified, the one or more distribution center specific stores are also identified accordingly. Below exemplary pseudo code depicts a method of identifying one or more distribution center specific stores:

Pseudo code: Determination of top stores (one or more distribution center specific stores) in the vicinity of regional DC is done by identifying the most frequent line items in the sales data.

```
StoresTop10 ← dict( )
For all name, row E Pandas.groupby(['regional dc']):
    s10 ← row['store'].value_counts( ).head(10)
    StoresTop10[name] ← s10
Return StoresTop10
```

By way of example, in some embodiments, exemplary training data comprising of 3 regional DC's and 10 stores each in their vicinity is provided in Table 6 below:

TABLE 6

| Regional DC's | Vicinity stores list |
|---|---|
| Dc 0 | [343, 1366, 369, 97, 1861, 2794, 576, 644, 5241, 2121] |
| Dc 1 | [152, 399, 71, 1300, 437, 55, 657, 301, 1292, 1245] |
| Dc 2 | [770, 136, 1643, 244, 903, 2480, 220, 84, 709, 327] |

Figure 4:
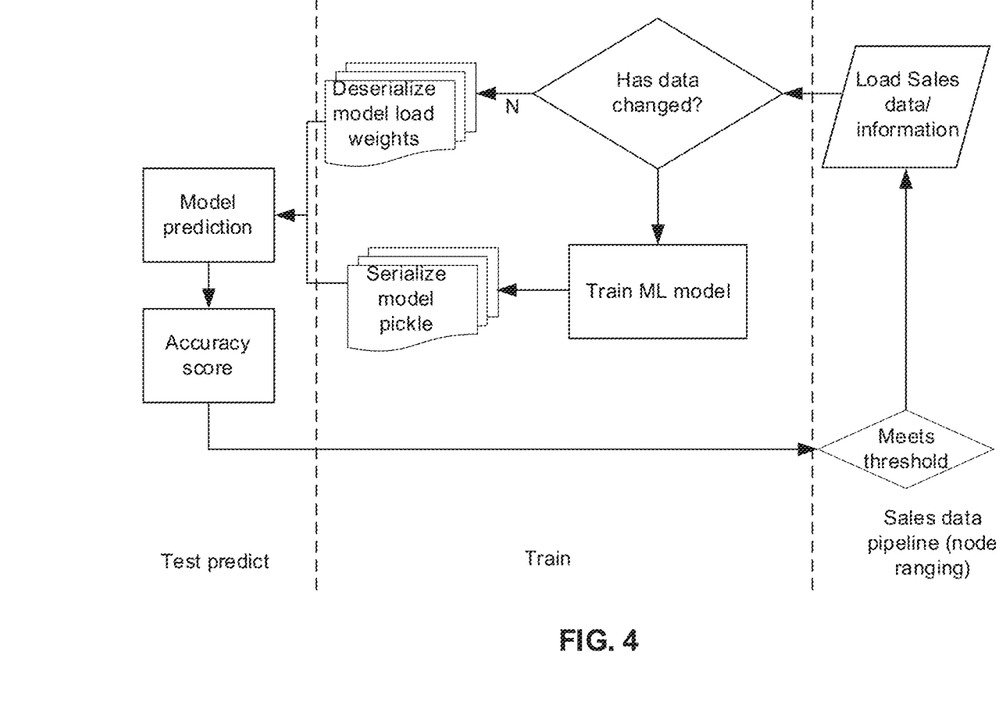
FIG. 4 depicts a flow chart illustrating a method of supervised machine learning (ML) model training and evaluation, in accordance with an embodiment of the present disclosure.

Referring to steps of FIG. 2, at step 210 of the method of the present disclosure, the one or more hardware processors 104 recommend a set of store specific items based on the one or more distribution center specific stores and the one or more distribution centers being identified at step 208. Using an AI model facilitates elimination of various system overheads in a light trained pickle.bin (10's kb). This can be used to determine node ranging information whether in a supervised model or using reinforcement learning. Specific implementation of the model serialization is done in the python/ML library. FIG. 4, with reference to FIGS. 1 through 3, depicts a flow chart illustrating a method of supervised machine learning (ML) model training and evaluation, in accordance with an embodiment of the present disclosure. By way of example, in some embodiments, exemplary training data comprising of top 50 items in the above stores and DC's is provided in Table 7 below:

TABLE 7

| Items list |
|---|
| [1018, 1669, 1797, 903, 904, 905, 1671, 1037, 1039, 1040, 913, 911, 915, 921, 922, 924, 29, 1823, 1699, 941, 942, 176, 945, 434, 179, 180, 181, 1842, 183, 696, 1082, 1212, 957, 1085, 1214, 1858, 1478, 712, 713, 1483, 1484, 1486, 976, 1233, 83, 1619, 86, 1111, 470, 741, 1781, 1784, 1786, 1787, 1788] |

In FIG. 4, the supervised machine learning (ML) model and the reinforcement learning (RL) model are trained and evaluated using a learning framework based on the sales information to obtain a pickle bin serialization model. More specifically, the supervised machine learning (ML) model is obtained by obtaining sales information pertaining to the plurality of associated stores (refer top selling items as described above).

Figure 6:
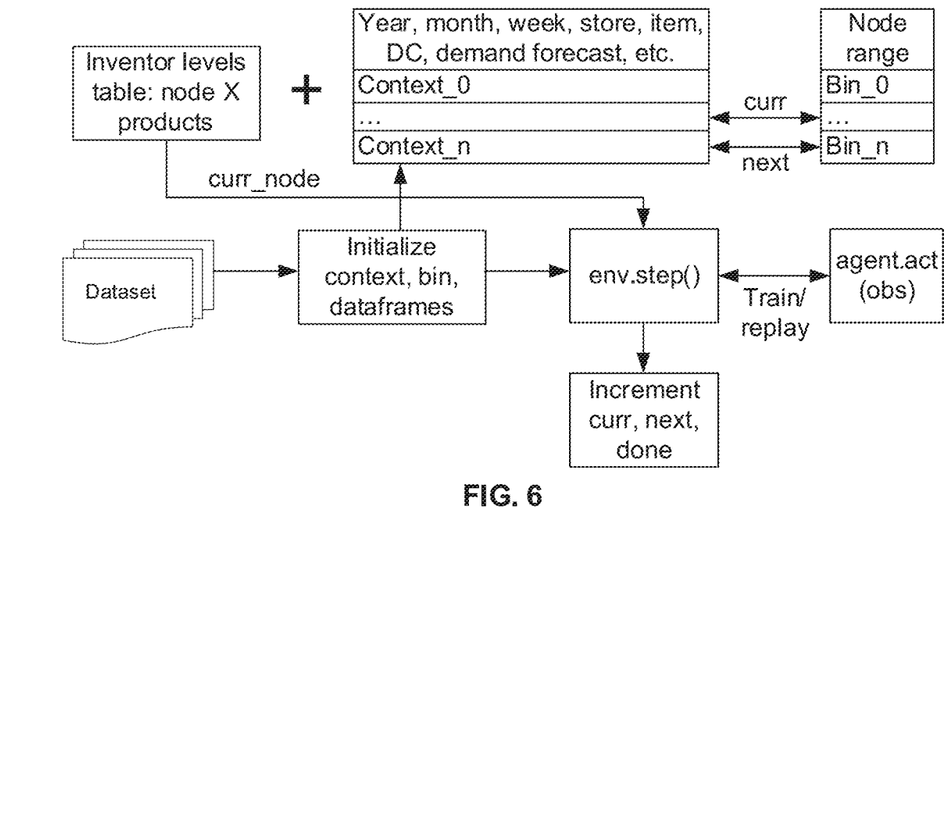
FIG. 6 depicts a current node context reinforcement learning (RL) model training architecture as implemented by the system of FIG. 1, in accordance with an embodiment of the present disclosure.
Figure 7:
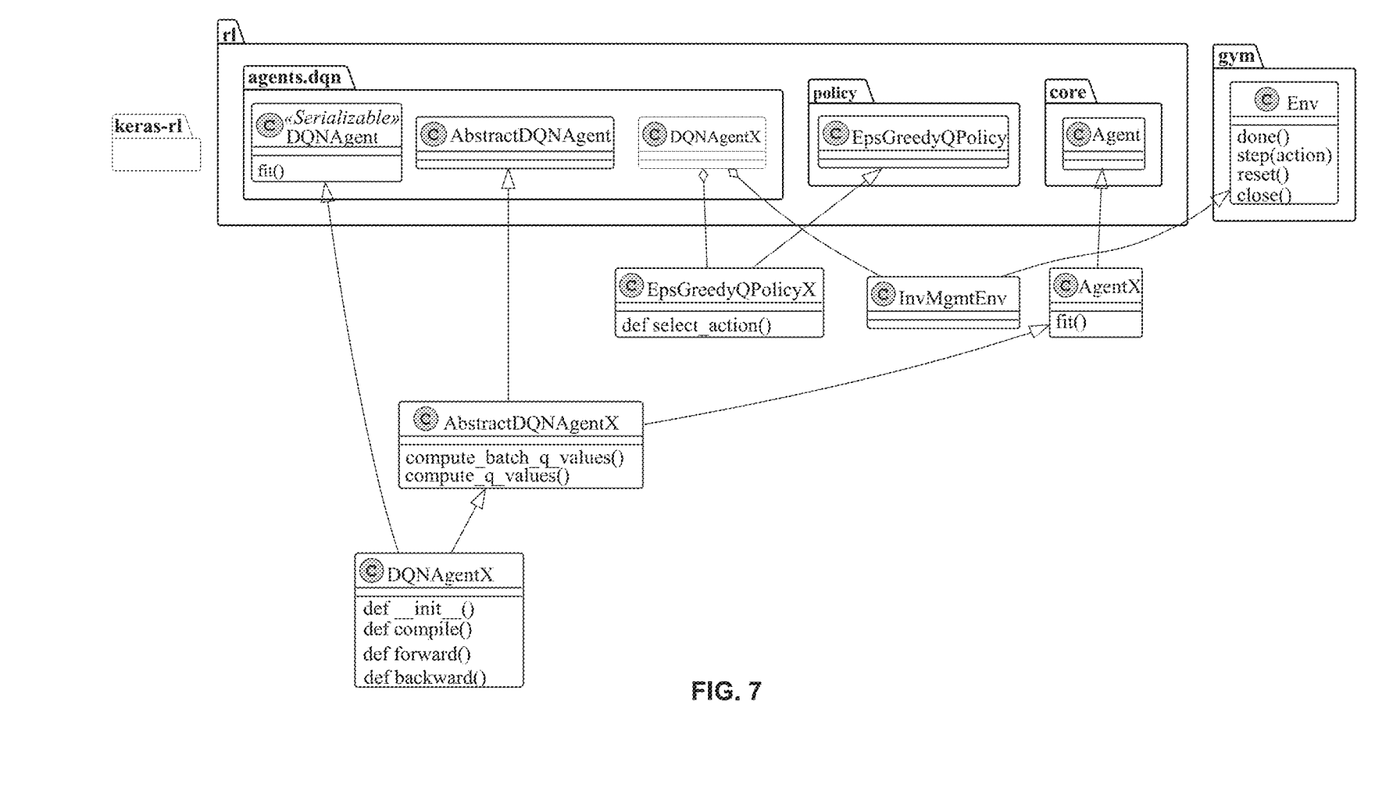
FIG. 7 depicts a keras RL multi action agent implementation by the system of FIG. 1, in accordance with an embodiment of the present disclosure.

A time step observation is provided to the RL model for training along with the sales information, in one example embodiment (refer below pseudo code for the time step observation). Further, the RL model is configured to provide an action corresponding to the time step observation to range items from the one or more categorical sales bins. The system 100 has been envisaged for model training in keras-rl. and gym class was implemented accordingly. A custom environment architecture model that extends the OpenAI gym base class was created to model node range including defined reward criteria. FIG. 6, with reference to FIGS. 1 through 5, depicts a current node context reinforcement learning (RL) model training architecture as implemented by the system 100 of FIG. 1, in accordance with an embodiment of the present disclosure. As mentioned above, a unique set of features such as date, item, store, DC, and ecom have been identified as novel to the node range problem. These are gathered in a sales dataset and used to constitute a context information in the node range environment. In conjunction with a node inventory level for a given product the environment provides a time step observation to a RL agent (RL model) for training. The RL agent in turn provides an action corresponding to the observation to range items from a categorical bin of values. keras-rl multi action agent was implemented and tested (not shown in FIGS.) to demonstrate. It showed increasing rewards for training. These extend the keras-rl base class implementations for multi-discrete actions which functionality in unavailable in the native libraries. This can be used to train a gym.spaces.multi_discrete.MultiDiscrete. This is not supported in keras-rl out-of-the-box which uses the gym.spaces.Discrete action class. Typically, long format data is used to train a discrete action RL model such as the cart pole environment. Referring to FIG. 7, a keras-rl multi-discrete model lets the system 100 and method of the present disclosure train on wide format data for such an application in node range. More specifically, FIG. 7 depicts a keras RL multi action agent implementation by the system of FIG. 1, in accordance with an embodiment of the present disclosure.

Figure 8:
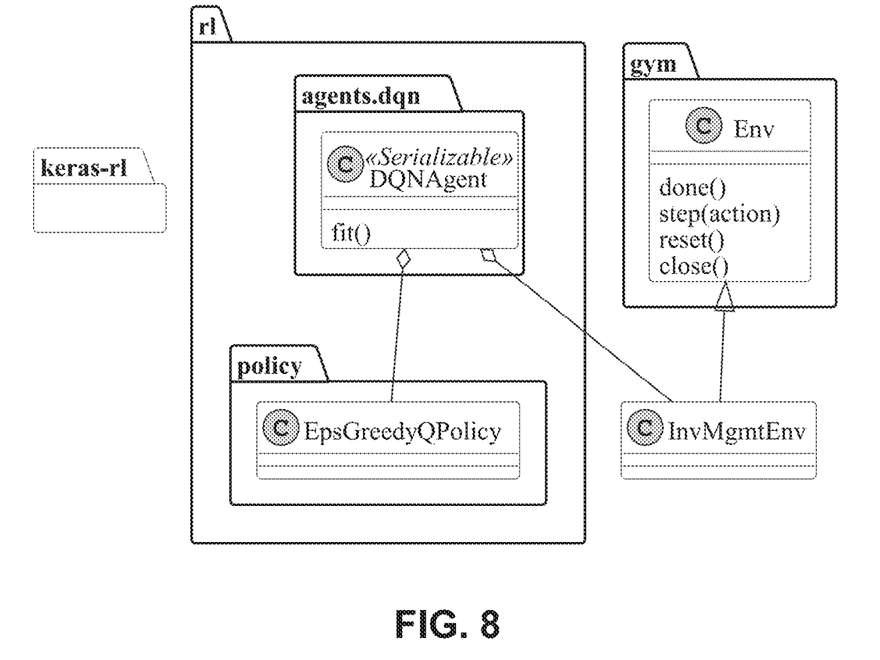
FIG. 8 depicts an inventory management custom environment created to follow the gym class implementation, in accordance with an embodiment of the present disclosure.

Referring to steps of FIG. 2, the supervised machine learning (ML) model is trained if there is a change observed in the sales information, and a pickle of the supervised ML model being trained is serialized. FIG. 8 depicts to an inventory management custom environment created to follow the gym class implementation, in accordance with an embodiment of the present disclosure. Referring to FIG. 8, below pseudo code illustrates an exemplary method of training artificial intelligence (AI)/reinforcement learning (RL) model:

Listing 1: Gym GAN Inventory environment

```
Pseudo code: For training artificial intelligence (AI)/reinforcement
learning (RL) model
A custom environment has been created to follow the gym interface.
    class InvMgmtEnv (gym.Env):
        n_actions = 4
        max_inventory = 50
        number_dcs = 3
        number_stores = 6
        number_context = 7 # month, week number, node, gan, division, ecom,
        sales
        self.action_space = spaces.Discrete(n_actions)
        self.observation_space = spaces.Box(low=0, high=
        max_inventory,
```

-continued

Listing 1: Gym GAN Inventory environment

```
shape=(number_dcs + number_stores +
    number_context,)
```

Check env interface using stable baselines env_checker, monitor for reward logging.

It is to be understood by a person having ordinary skill in the art or person skilled in the art that sales data is cleaned/pre-processed through a series of steps prior to training.

Figure 5:
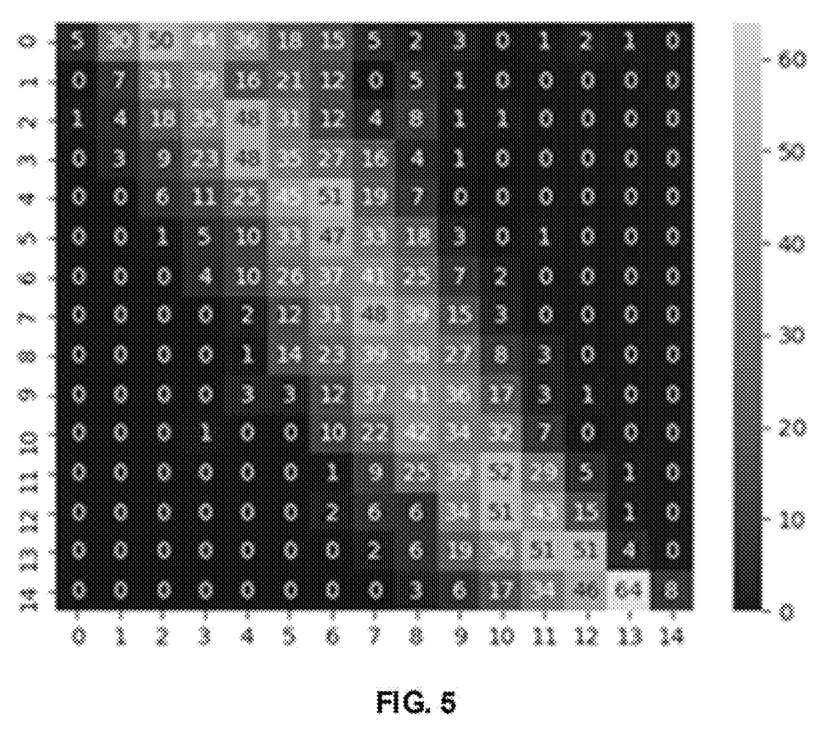
FIG. 5 depicts a confusion matrix, in accordance with an embodiment of the present disclosure.

If there is no change in the sales information received as an input, then the system 100 deserializes one or more load weights of the ML model based on the sales information. Further, one or more items are predicted by using the supervised ML model and the one or more load weights of the ML model. The items are predicted based on one or more inputs received wherein vicinity DCs are identified and the identified DCs are appended to the one or more inputs received to obtain an updated input. The updated input with appended details of DCs serves is fed to the ML model for inventory prediction wherein the items are predicted that need to be stocked in one or more stores/DCs. An accuracy score of the supervised ML model for the one or more predicted item is then evaluated to determine a performance of the supervised ML model. The system 100 implemented the supervised machine learning and reinforcement learning models to address the problem of intelligent node range wherein a custom user interface is created in HTML (Hypertext Markup Language), jQuery wherein a user can specify the date, store, and item GAN information to determine the range of the item to be sized at the corresponding store. Sales quantities were grouped into categorical bins to be input to the ML models (e.g., refer categorical sales bins-number of units as described above). The supervised learning done enabled the ML model to be able to accurately predict inventory to be stocked in store and DC (e.g., refer confusion matrix depicted in FIG. 5). More specifically, FIG. 5, with reference to FIGS. 1 through 4, depicts a confusion matrix, in accordance with an embodiment of the present disclosure. A k-nearest neighbors. and xgboost models were used to determine a forecast. A confusion matrix as depicted in FIG. 5, is used to determine the accuracy of the forecasting model as a visualization. Each square in the matrix contains the number count of the items for true (y-axis) and predicted values (x-axis) highlighted by the legend. A diagonal trend indicates suitability of the trained model. Eg. For y_true, y_pred=7 there are 48 such values predicted by the AI/ML model. Off-diagonal values indicate misclassified values by the prediction model. Indices on the x and y axes correspond to the categorical bins created.

The features such as date, SKUs, GAN, information on e-commerce channel serve as a request input to the ML model for node ranging or sizing of items. The step of sizing of items is done by the supervised machine learning (ML) model and a reinforcement learning (RL) model (also referred as RL agent and interchangeably used herein). In this regard, at step 212 of the method of the present disclosure, the one or more hardware processors 104 determine, by using the supervised machine learning (ML) model and the reinforcement learning (RL) model, a range of items to be sized from the recommended set of store specific items at each of the one or more distribution center specific stores based on the second input comprising the date, the one or more stores, and the set of items. The range of items are determined based on most frequent line items being identified from the received first input. In an embodiment, the supervised machine learning (ML) model is trained/obtained by obtaining sales information pertaining to the plurality of associated stores. Further, at least one of is performed: (i) training the supervised machine learning (ML) model based on a change observed in the sales information and serializing a pickle of the supervised ML model being trained; or (ii) deserializing one or more load weights of the ML model based on the sales information. Further, one or more items are predicted by using the supervised ML model and the one or more load weights of the ML model. An accuracy score of the supervised ML model is evaluated for the one or more predicted items. In the event of certain stores or DC's becoming offline in a supply chain network and unable to service a customer order the system and method of the present disclosure implementing the supervised ML model and RL model account for variations in sizing range under such circumstances. Inventory ranges corresponding to offline stores and dc's in the vicinity of a given store are summed to predict a sizing range for the item.

Referring to steps of FIG. 2, at step 212 of the method of the present disclosure, the one or more hardware processors 104 determine, by using the supervised machine learning (ML) model and the reinforcement learning (RL) model a range of items to be sized from the recommended set of store specific items at each of the one or more distribution center specific stores based on the second input comprising the date, the one or more stores, and the set of items. The range of items are determined based on the most frequent line items being identified from the received first input. The model provides a categorical bin value corresponding to a unit number of sales for an item to be ranged. The range of items sized (also referred as node ranging and interchangeably used herein) is depicted in Table 8, by way of examples.

TABLE 8

| | |
|---|---|
| request | {'date': 12-02-2020, 'store': 343, 'item': 1018, 'dc': 0, 'ecom': 1} |
| response | {'bin': 3, 'sales': [4, 6], 'dc': 0} |

By way of example, in some embodiments, exemplary training data comprising of sales categorical bins is provided in Table 9:

TABLE 10

| | |
|---|---|
| 0 | (0.0, 2.0] |
| 1 | (2.0, 3.0] |
| 2 | (3.0, 4.0] |
| 3 | (4.0, 6.0] |
| 4 | (6.0, 9.0] |
| 5 | (9.0, 14.0] |
| 6 | (14.0, 40.0] |

In an embodiment, the one or more hardware processors 104 further forecast items sale for a subsequent time duration using the one or more categorical sales bins.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, via one or more hardware processors, a first input further comprising a date pertaining to one or more features specific to sales of items, one or more stock keeping units specific to one or more items, information specific to a plurality of associated stores, a plurality of distribution centers, an online sales information pertaining to the one or more items, an affinity associated with the one or more items, a sales forecast, an associated geography, and a demography, wherein a plurality of stores are in a vicinity of each of the plurality of distribution centers, and wherein each store from the plurality of associated stores comprises a node value;
   pre-processing, via the one or more hardware processors, the received first input to obtain a pre-processed data;
   obtaining, via the one or more hardware processors, a second input further comprising a date, one or more stores, one or more ecommerce channels, and a set of items;
   identifying, via the one or more hardware processors, one or more distribution centers and one or more distribution center specific stores based on the pre-processed data;
   recommending, via the one or more hardware processors, a set of store specific items based on the one or more distribution center specific stores and the one or more distribution centers being identified; and
   determining, by using a supervised machine learning (ML) model and a reinforcement learning (RL) model, via the one or more hardware processors, a range of items to be sized from the recommended set of store specific items at each of the one or more distribution center specific stores based on the second input further comprising the date, the one or more stores, and the set of items; wherein the range of items are determined based on most frequent line items being identified from the received first input.

2. The processor implemented method of claim 1, wherein the first input is pre-processed for creation of one or more categorical sales bins and elimination of skewed data from the first input.

3. The processor implemented method of claim 2, further comprising forecasting items sale for a subsequent time duration using the one or more categorical sales bins.

4. The processor implemented method of claim 1, wherein the supervised machine learning (ML) model is obtained by:
   obtaining sales information pertaining to the plurality of associated stores;
   performing at least one of:
   (i) training the supervised machine learning (ML) model based on a change observed in the sales information, and serializing a pickle of the supervised ML model being trained; or
   (ii) deserializing one or more load weights of the ML model based on the sales information;

predicting one or more items by using the supervised ML model and the one or more load weights of the ML model; and evaluating an accuracy score of the supervised ML model for the one or more predicted items.

5. The processor implemented method of claim 4, wherein the supervised machine learning (ML) model and the reinforcement learning (RL) model are trained and evaluated using a learning framework based on the sales information to obtain a pickle bin serialization model, wherein a time step observation is provided to the RL model for training along with the sales information, and wherein the RL model is configured to provide an action corresponding to the time step observation to range items from the one or more categorical sales bins.

6. A system, comprising:
a memory storing instructions;
one or more communication interfaces; and
one or more hardware processors coupled to the memory via the one or more communication interfaces, wherein the one or more hardware processors are configured by the instructions to:
receive a first input further comprising a date pertaining to one or more features specific to sales of items, one or more stock keeping units specific to one or more items, information specific to a plurality of associated stores, a plurality of distribution centers, an online sales information pertaining to the one or more items, an affinity associated with the one or more items, a sales forecast, an associated geography, and a demography, wherein a plurality of stores are in a vicinity of each of the plurality of distribution centers, and wherein each store from the plurality of associated stores comprises a node value;
pre-process the received first input to obtain a pre-processed data;
obtain a second input further comprising a date, one or more stores, one or more ecommerce channels, and a set of items;
identify one or more distribution centers and one or more distribution center specific stores based on the pre-processed data;
recommend a set of store specific items based on the one or more distribution center specific stores and the one or more distribution centers being identified; and
determine, by using a supervised machine learning (ML) model and a reinforcement learning (RL) model, a range of items to be sized from the recommended set of store specific items at each of the one or more distribution center specific stores based on the second input further comprising the date, the one or more stores, and the set of items; wherein the range of items are determined based on most frequent line items being identified from the received first input.

7. The system of claim 6, wherein the first input is pre-processed for creation of one or more categorical sales bins and elimination of skewed data from the first input.

8. The system of claim 7, wherein the one or more hardware processors are further configured by the instructions to forecast items sale for a subsequent time duration using the one or more categorical sales bins.

9. The system of claim 6, wherein the supervised machine learning (ML) model is obtained by:
obtaining sales information pertaining to the plurality of associated stores;

performing at least one of:
(i) training the supervised machine learning (ML) model based on a change observed in the sales information, and serializing a pickle of the supervised ML model being trained; or
(ii) deserializing one or more load weights of the ML model based on the sales information;
predicting one or more items by using the supervised ML model and the one or more load weights of the ML model; and
evaluating an accuracy score of the supervised ML model for the one or more predicted items.

10. The system of claim 9, wherein the supervised machine learning (ML) model and the reinforcement learning (RL) model are trained and evaluated using a learning framework based on the sales information to obtain a pickle bin serialization model, wherein a time step observation is provided to the RL model for training along with the sales information, and wherein the RL model is configured to provide an action corresponding to the time step observation to range items from the one or more categorical sales bins.

11. One or more non-transitory machine-readable information storage mediums comprising one or more instructions which when executed by one or more hardware processors cause:
receiving a first input further comprising a date pertaining to one or more features specific to sales of items, one or more stock keeping units specific to one or more items, information specific to a plurality of associated stores, a plurality of distribution centers, an online sales information pertaining to the one or more items, an affinity associated with the one or more items, a sales forecast, an associated geography, and a demography, wherein a plurality of stores are in a vicinity of each of the plurality of distribution centers, and wherein each store from the plurality of associated stores comprises a node value;
pre-processing the received first input to obtain a pre-processed data;
obtaining a second input further comprising a date, one or more stores, one or more ecommerce channels, and a set of items;
identifying one or more distribution centers and one or more distribution center specific stores based on the pre-processed data;
recommending a set of store specific items based on the one or more distribution center specific stores and the one or more distribution centers being identified; and
determining, by using a supervised machine learning (ML) model and a reinforcement learning (RL) model, a range of items to be sized from the recommended set of store specific items at each of the one or more distribution center specific stores based on the second input further comprising the date, the one or more stores, and the set of items; wherein the range of items are determined based on most frequent line items being identified from the received first input.

12. The one or more non-transitory machine-readable information storage mediums of claim 11, wherein the first input is pre-processed for creation of one or more categorical sales bins and elimination of skewed data from the first input.

13. The one or more non-transitory machine-readable information storage mediums of claim 12, wherein the one or more instructions which when executed by the one or more hardware processors further cause forecasting items sale for a subsequent time duration using the one or more categorical sales bins.

14. The one or more non-transitory machine-readable information storage mediums of claim 11, wherein the supervised machine learning (ML) model is obtained by:
    obtaining sales information pertaining to the plurality of associated stores;
    performing at least one of:
    (i) training the supervised machine learning (ML) model based on a change observed in the sales information, and serializing a pickle of the supervised ML model being trained; or
    (ii) deserializing one or more load weights of the ML model based on the sales information;
    predicting one or more items by using the supervised ML model and the one or more load weights of the ML model; and
    evaluating an accuracy score of the supervised ML model for the one or more predicted items.

15. The one or more non-transitory machine-readable information storage mediums of claim 14, wherein the supervised machine learning (ML) model and the reinforcement learning (RL) model are trained and evaluated using a learning framework based on the sales information to obtain a pickle bin serialization model, wherein a time step observation is provided to the RL model for training along with the sales information, and wherein the RL model is configured to provide an action corresponding to the time step observation to range items from the one or more categorical sales bins.

* * * * *